July 22, 1958   W. E. INGRAM ET AL   2,843,966
DEPTH REGULATOR FOR FISH LURE
Filed Feb. 4, 1957

WAYNE E. INGRAM
ALFRED W. BELL

INVENTOR.

BY *Herbert J. Brown*

ATTORNEY

United States Patent Office 2,843,966
Patented July 22, 1958

2,843,966

DEPTH REGULATOR FOR FISH LURE

Wayne E. Ingram and Alfred W. Bell, Fort Worth, Tex., assignors to Marine Research, Inc., Fort Worth, Tex., a corporation of Texas Application February 4, 1957, Serial No. 637,933

3 Claims. (Cl. 43—43.13)

This invention relates to fishing tackle and has reference to a depth regulator for fish lures and bait when trolling from a boat.

When trolling it is sometimes desirable to let out considerable line so as to allow the lure to run behind the wake of the boat, particularly if the boat is traveling faster than usual trolling speeds. At such speeds, a lure without a depth regulator would tend to dive too deep. It is also well known that weather conditions affect the depth at which fish are found. Thus, a depth regulator connected in a trolling line having a lure or bait on the end thereof is highly desirable. While regulators for the same general purpose have been proposed heretofore, they have not been entirely satisfactory since they did not have selectivity for operation at all desired depths and because they were prone to snag on objects beneath the water's surface.

An object of the invention is to provide a depth regulator for fish lures capable of adjustment for running at any desired depth.

A particular object is to provide a depth regulator which will dislodge itself when snagged on an object beneath the water's surface.

An additional object is to include a float for a fish lure depth regulator, and which float is designed and arranged so as to lend stability to the regulator during its operation.

These and other objects will be come apparent from the following description and the accompanying drawing, wherein.

Figure 3:
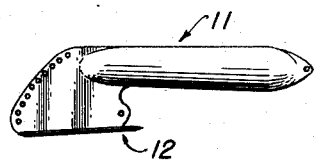
Figure 3 is a reduced scale side elevation of the regulator shown in Figures 1 and 2.
Figure 1:
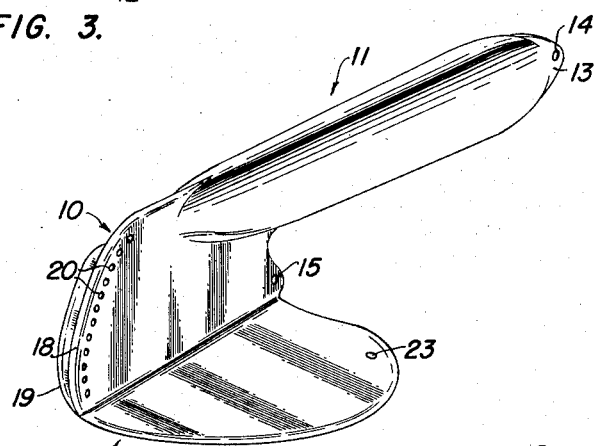
Figure 1 is a perspective view of a fish lure depth regulator in accordance with the invention.
Figure 2:
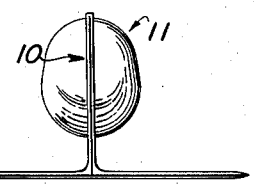
Figure 2 is a front elevation of the regulator shown in Figure 1.

The depth regulator shown is primarily comprised of a vertical fin 10, a rearwardly extending float 11 on the upper rear portion of the fin, and a transverse stabilizing vane 12 across the lower edge of the fin. The float 11 is streamlined, and the rear end thereof has a vertical ear 13 and hole 14 therethrough for attaching a hook, spinner or similar device (not shown) if so desired.

Figure 5:
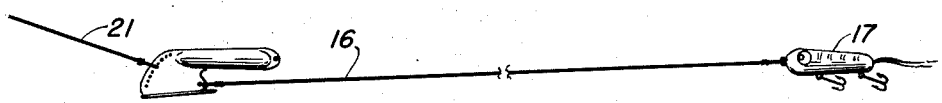
Figure 5 is a side elevation showing the regulator connected in a trolling line and showing an artificial lure attached thereto.

A hole 15 is provided through the rear edge of the vertical fin just above the stabilizing vane 12, and which hole is for the attachment of a length of line or leader 16 extending to an artificial lure 17 or other bait. The forward edge 18 of the vertical fin 10 is curved upwardly and rearwardly from the forward edge 19 of the stabilizing vane 12, and which curved fin edge is provided with multiple transverse holes 20 for selectively attaching the present device to one end of the trolling line 21, as shown in Figure 5.

Figure 4:
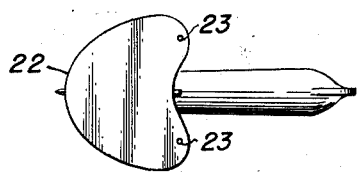
Figure 4 is a bottom plan view of Figure 3.

The stabilizing vane 12 is generally triangular, as shown in Figure 4, but all corners are round so as to reduce the possibility of becoming snagged on underwater objects. It will also be noted, particularly in Figure 4, that the apex 22 of the stabilizing vane is forwardly located so as to reduce the likelihood of snagging. Holes 23 may be provided in the outer rear edges of the vane 12 for the attachment of hooks, spinners or the like (not shown) if so desired. Preferably, the plane of the stabilizing vane 12 is at an angle with respect to the longitudinal center of the float 11, and which angle places the forward leading edge 19 of the vane 12 farther from said center line than the rear edge of said vane.

In operation, the lure 17 or bait is attached by the line or leader 16 to the hole 15 in the rear of the vertical fin 10. If the lure 17 is to be run at its greatest depth, then the trolling line 21 is attached to the uppermost hole 20 in said fin, and shallower depths are accomplished by attachment to other holes. If the forward end of the depth regulator should become lodged against an underwater obstruction, trolling is suspended and the rearwardly extending float 11 acts as a lever to dislodge the device.

The invention is not limited to the exemplary construction herein shown and described, but may be made in various ways within the scope of the appended claims.

What is claimed is:

1. A depth regulator for a fish lure, said regulator comprising a vertical fin, a float on the upper portion of said fin, a stabilizing vane transversely secured to the lower portion of said fin, means adapted to facilitate the attachment of a lure to the rear edge of said fin, and means adapted to facilitate the attachment of a trolling line to the forward edge of said fin.

2. A depth regulator for a fish lure as defined in claim 1, and wherein said float extends rearwardly of the vertical fin.

3. A depth regulator for a fish lure as defined in claim 1, and wherein the forward edges of said stabilizing vane extend outwardly and rearwardly of the forward edge of the vertical fin.

References Cited in the file of this patent

UNITED STATES PATENTS

| 2,062,718 | Kallberg | Dec. 1, 1936 |
| 2,566,029 | Louthan | Aug. 28, 1951 |
| 2,741,863 | Magill | Apr. 17, 1956 |